United States Patent [19]

Donnard

[11] Patent Number: 5,012,999
[45] Date of Patent: May 7, 1991

[54] LOCKING ASSEMBLY WITH RETRACTABLE INTEGRATED PIN FOR LOAD-SUPPORTING STRUCTURE

[75] Inventor: Rene Donnard, Geispolsheim, France

[73] Assignee: Lohr Industrie, S.A., Hangenbieten, France

[21] Appl. No.: 201,791

[22] Filed: Jun. 3, 1988

[30] Foreign Application Priority Data

Jun. 3, 1987 [FR] France ................. 87 07856

[51] Int. Cl.⁵ .............................................. A62B 35/00
[52] U.S. Cl. ...................................... 248/685; 410/83; 108/53.1
[58] Field of Search ................ 108/53.1, 51.1; 248/346, 361; 410/83

[56] References Cited

U.S. PATENT DOCUMENTS

| | | | |
|---|---|---|---|
| 3,363,590 | 1/1968 | Cloyd et al. | 108/53.1 |
| 3,521,764 | 7/1970 | Loomis | 108/53.1 X |
| 3,545,713 | 12/1990 | Mowatt-Larssen | 410/83 |
| 3,620,388 | 11/1971 | Mansson | 108/53.1 X |
| 3,734,445 | 5/1973 | Werner et al. | 410/83 |
| 4,309,013 | 1/1982 | Howe | 108/53.1 X |
| 4,319,732 | 3/1982 | Godfrey | 108/53.1 X |
| 4,546,945 | 10/1985 | Nessfield | 108/53.1 X |
| 4,591,307 | 5/1986 | Clive-Smith | 410/83 |
| 4,638,744 | 1/1987 | Clive-Smith | 108/53.1 X |
| 4,758,123 | 7/1988 | Corompt | 410/83 X |

*Primary Examiner*—Peter A. Aschenbrenner
*Attorney, Agent, or Firm*—Schwartz & Weinrieb

[57] ABSTRACT

Locking assembly with integrated retractable locking head for handling, transport, and storage by stacking of load-carrying structures.

Locking assembly characterized by comprising on three adjacent faces, including the bottom face, an oblong opening (10) for locking with a standardized locking head and by comprising a locking device (1) which is retractable and integral with a movable support (12) with a locking head (11) between a retracted position inside the assembly in which the bottom face of the support is in the plane of the top face of the assembly, and an extended working position in which the supporting plate (17), supporting the locking head, is an extension of the top surface of the assembly.

This invention is useful for designers of containers and shipping materials.

8 Claims, 2 Drawing Sheets

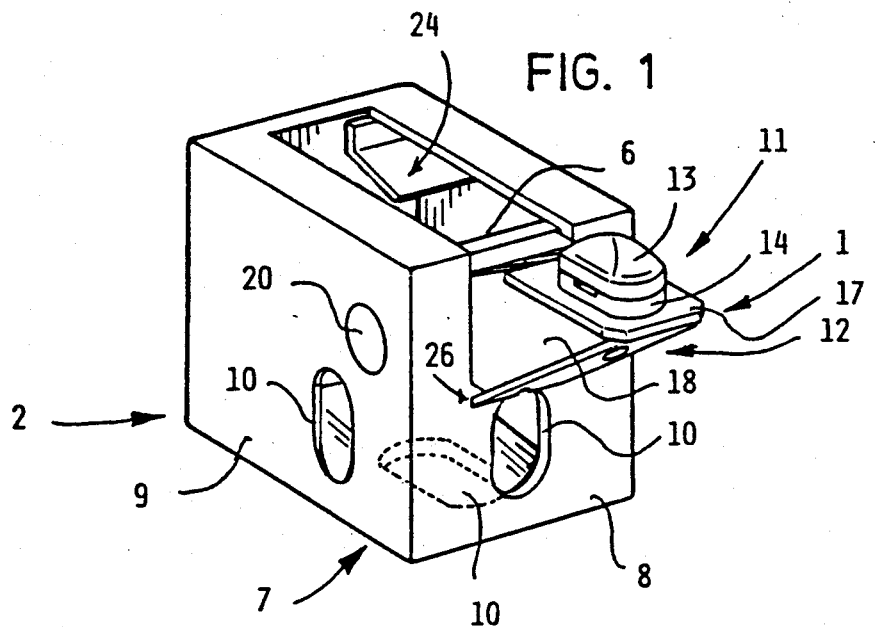
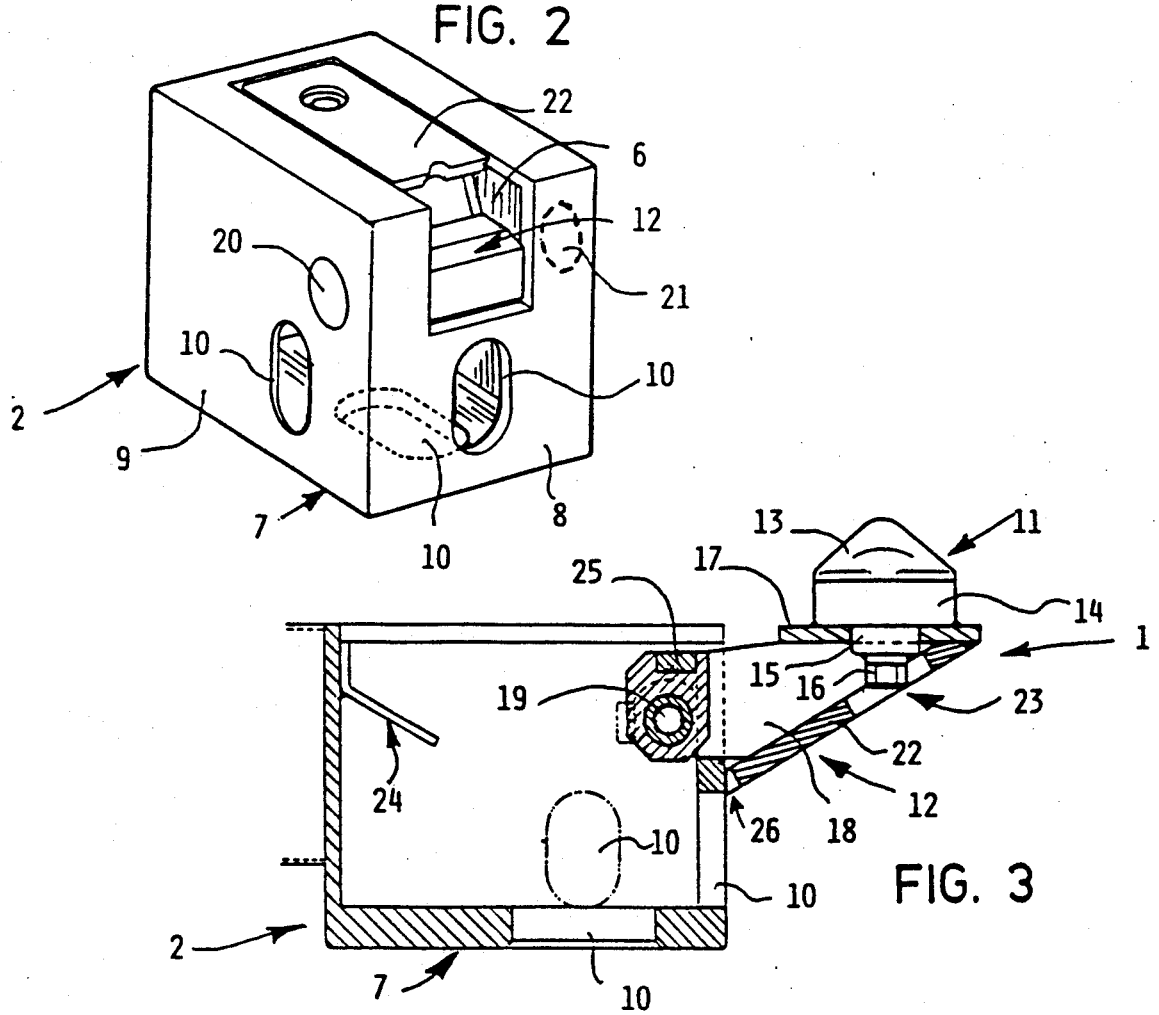

LOCKING ASSEMBLY WITH RETRACTABLE INTEGRATED PIN FOR LOAD-SUPPORTING STRUCTURE

The present invention refers to a retractable and integrated locking assembly for handling, transport, and storage of pallet containers, load-carrying platforms, and other load supports.

This invention is used in the area of road transport, as well as marine transport in which the load supports are held on the chassis or supporting decks by means of a quick connection using blocking elements called "ISO" blocks because of their standard characteristics.

Various means and systems for supporting loads such as containers, particularly pallet containers, various platforms, load-carrying plates, attached chassis, etc., are joined to supporting structures by connecting elements for rapid assembly and disassembly employing an angle block provided with openings or passageways in which a pivoting locking head can be engaged by a locking device integral with the supporting structure.

In this manner, the load-carrying structures of the plate, platform, container or other type, are rendered immovable so that the load of the supporting structure can be removed without setting it down and to benefit from all of the mechanical independence required for efficiency in shipping and haulage.

This independence enables load-carrying structures to be stacked, plate on plate, and to be transported back again when empty by a single carrying vehicle.

In this manner the thickness of the front panel bearing the element for gripping the platform does not allow precise edge-to-edge superposition of the plates and the offset which is thus observed makes it impossible to achieve the necessary alignment of the locking openings in the standard angle blocks for integration by means of the locking heads of the locking devices below. It is therefore necessary not only to align the locking heads and locking openings in the upper angle blocks but also to easily retract the locking head in the supporting level.

Locking devices with heads that retract by deflection are known, which leave the top surface of the block into which they are recessed perfectly free and flat.

Unfortunately the elements for manipulating the head during the retracting and locking movements are separate, one located on one of the side faces and the other beneath the block into which the head retracts.

The use of such locking devices proves to be nearly impossible for use as planned offset below the angle blocks because of the difficulty and even impossibility of operating the control elements.

Moreover, all of the locking assemblies which are adaptable in a removable fashion to the rear of a supporting structure are not suitable because of the multiple drawbacks, stowing actions, losses, and assembly times arising from the detachable nature of these assemblies.

The designers have attempted to integrate into the plate of the supporting structure, retractable mechanical elements each of which has a locking head at the end.

These elements are produced for example in the form of articulated feet or arms which can retract by pivoting into a resting position into recesses to a degree sufficient to present a lower face located in the plane of the supporting plate, causing all projections relative to the loading surface to disappear.

Each arm has one free end offset toward the exterior and having a locking head so disposed that it coincides with the standard tie-down block of the superimposed platform located immediately above.

While these devices in theory conform to the goals of the present invention, they necessitate the manufacture of a specific platform for their integration whose design is more complex. Moreover, the increase in weight and space requirements present additional problems.

The goal of the present invention is to overcome these disadvantages by providing a locking assembly with an integrated retractable lock, which is essentially practical and fully compatible with the standard parts in current use.

For this purpose the invention relates to a locking assembly for joining two supporting structures superimposed vertically one on the other, characterized by the fact that each of at least three of its adjacent faces, including the lower face, has an oblong opening for locking by means of a standardized lock, and by the fact that it includes a device with a retractable lock integral with a support, which has, on a supporting plate, a locking head, which support is movable between a retracted resting position inside the assembly in which the bottom face of the support is flush with the top face of the assembly, and an extended working position in which the supporting plate is an extension of the upper surface of the assembly.

Apart from the two general conditions of locating the locking head firstly to the right of the offset end block of the upper supporting structure and (2) in a retracted position without projecting relative to the loading surface, the locking assembly according to the invention has a number of advantages of which only the most important will be listed.

Very low space requirements relative to the dimensions of the supporting structures: platforms, containers, or the like.

The retracted assembly fits inside the volume of the locking block.

It fits perfectly into the mechanical environment of the platforms and simultaneously fills two essential functions, locking upward and receiving structures below.

The additional weight is low.

The top surface of the block is continuous and in the plane of the loading face when the locking device is retracted.

Perfect mechanical integration from the outset.

The technical specifications and other advantages are given in the description which follows, which refers without limitation to an embodiment of the invention referred to in the drawings:

FIG. 1 is a perspective view of a locking assembly according to the invention, with the locking device in the extended position;

FIG. 2 is a perspective view of a locking assembly according to the invention, with the locking device in the retracted position;

FIG. 3 is a view in lengthwise section, with the lock in the operating position;

According to the invention, a locking device 1 is incorporated into an assembly 2 to be mounted, usually but not exclusively, at the end of a supporting structure, for example a removable loading platform 3 as an extension of its load-carrying face 4.

Figure 4:
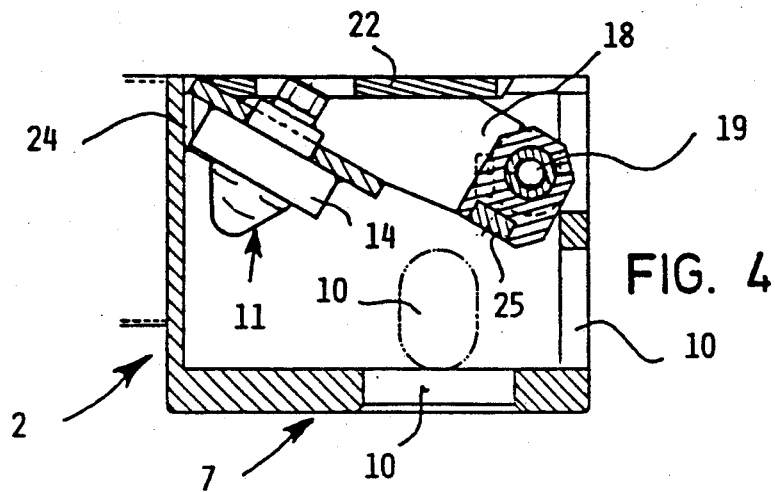
FIG. 4 is a view in cross section.
Figure 5:
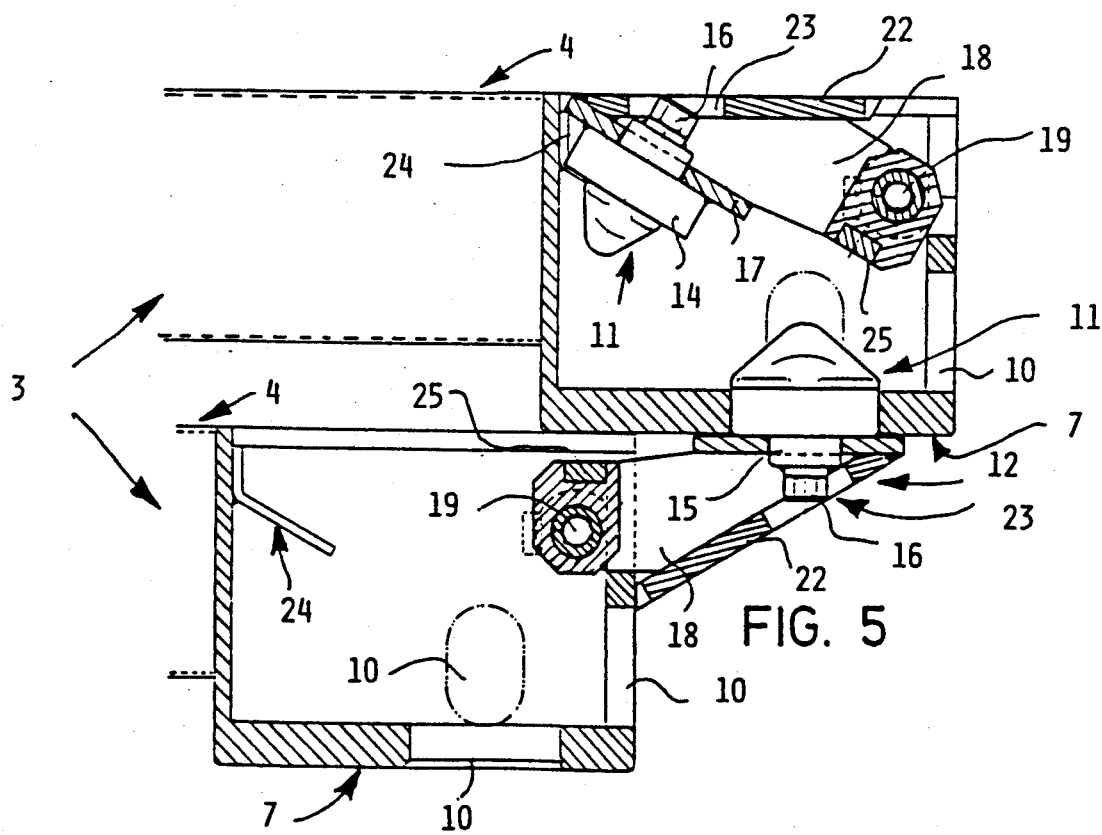
FIG. 5 is a lengthwise section through the ends of two supporting structures in a vertical stack, joined together in the locked state.

By virtue of its external dimensions, this assembly integrates perfectly with the chassis of the supporting structure in an extension of loading face 4, as can be seen in FIG. 5.

The assembly has an interior hollow volume 6 and comprises on at least three of its adjacent faces, including lower face 7 and two of its side faces 8 and 9, standardized oblong openings such as 10 into which the locking head of the classic locking device commonly known as a twist lock, of the lower platform fits during stacking.

The dimensions of the faces comprising openings 10 and the centering of these openings are chosen such that this part of the locking assembly according to the invention is identical in every respect to the classical standardized locking block used presently on classical support structures such as platforms, pallet containers, etc.

In this way, the advantages and the convenience of using standard locking blocks are retained.

Assembly 2 receives in the upper part of its hollow volume 6 the locking device 1 with a pivoting locking head 11, said locking device being mounted on a hinged support 12 articulated on assembly 2 between a retracted position in which it occupies a portion of the interior volume of said assembly and an extended or operating position in which locking head 11 extends in a general direction parallel to the lateral faces of assembly 2.

In a preferred embodiment, locking head 11 is the same as in known locking devices called twist locks with its upper centering pyramid 13, its protective jacket 14, and its pivot shaft 15 terminating in a hex nut 16 for the pivoting maneuver.

The locking head is mounted on a supporting plate 17 integral with a bracket 18 which is made to pivot around a hinge axis 19 held by flanges 20 and 21 integral with the walls of the assembly.

Bracket 18 terminates in an oblique face constituted by a sealing plate 22 traversed by an opening 23 which provides access to the operating nut for the locking head.

The dimensions of bracket 18 and the inclination of locking plate 22 are such that said locking plate occupies a position that coincides with the upper face of assembly 2 when the locking device is completely swiveled into the interior of assembly 2.

In order to immobilize support 12 in this position, an offset inclined stop plate 24 has been provided inside assembly 2, on which the locking head comes to rest after rotating a quarter of a turn, with said stop plate 24 serving to hold it in place.

The device is kept in the extended position (1) by the contact between a catch 25 and the edges of the opening through which support 12 emerges and (2) by contact between the transverse lower edge 26 of sealing plate 22 and the adjacent lateral face of assembly 2. In this position, supporting plate 17 is an exact extension of loading face 4 which coincides with the upper face of assembly 2.

The offset position of the locking head relative to locking assembly 2 permits locking in an offset superimposed position, for example, platforms or more generally any other supporting structures with dimensions greater than a standard template.

Locking assembly 2 according to the invention is easily integrated into any flooring structure to constitute a connecting and locking element on both sides of a supporting structure.

Joining to a supporting chassis is accomplished by a locking connection that traverses the lower opening for the transport under load configuration.

Because the locking device is retracted, no projecting structure interferes with the loading system.

In the stacking configuration, the maintenance and locking of the load-carrying structures on top of one another results from the swinging into the extended position of the locking device whose locking head 11 is perfectly aligned with the oblong opening in the lower face of the standard upper locking assembly. Passing the head through this opening and locking it by rotating it a quarter of a turn causes locking.

Of course, various obvious variations, modifications, additions, eliminations, and substitutions which are obvious and require no inventive effort are included in the scope of the present invention.

I claim:

1. A load-supporting extension assembly for use in connection with a load-supporting member having at least one external side wall, and an upper support surface upon which a load can be supported, comprising:

means defining within said load-supporting member a predetermined storage volume;

a load-supporting extension having a load-supporting surface and a support surface fixedly connected to said load-supporting surface; and means pivotally mounting said load-supporting extension upon said load-supporting member so as to be movable between a first storage position at which said load-supporting extension is housed within said predetermined storage volume of said load-supporting member, and a second operative load-supporting position, external of said predetermined storage volume, at which said support surface of said load-supporting extension engages said external side wall of said load-supporting member so as to support said load-supporting extension upon said load-supporting member such that said load-supporting surface of said load-supporting extension is co-planar with said upper support surface of said load-supporting member whereby a load can be supported upon both said upper support surface of said load-supporting member and said load-supporting surface of said load-supporting extension.

2. An assembly as set forth in claim 1, wherein:

said load-supporting extension extends said load-supporting member in a predetermined longitudinal direction when said load-supporting extension is disposed at said second operative position; and means mounting said load-supporting extension upon said load-supporting member for movement about an axis which is disposed transverse to said longitudinal direction.

3. An assembly as set forth in claim 1, further comprising:

a locking head mounted upon said load-supporting surface of said load-supporting extension so as to project upwardly therefrom; and means defining an aperture within a bottom wall portion of said load-supporting member for receiving said locking head of said load-supporting extension, whereby when a plurality of load-supporting members are vertically stacked one upon another, said locking head of a lower load-supporting extension can be lockingly engaged within an aperture of an upper load-supporting member.

4. An assembly as set forth in claim 4, wherein:
said support surface of said load-supporting extension is disposed at a predetermined angle with respect to said load-supporting surface of said load-supporting extension.

5. An assembly as set forth in claim 4, wherein:
said predetermined angle is such that when said load-supporting extension is disposed at said first storage position, said support surface of said load-supporting extension is co-planar with said support surface of said load-supporting member.

6. An assembly as set forth in claim 5, further comprising:
stop means disposed interiorly within said predetermined storage volume of said load-supporting member for engaging said support surface of said load-supporting extension when said load-supporting extension is disposed at said first storage position such that said support surface of said load-supporting extension is disposed in a co-planar manner with respect to said support surface of said load-supporting member.

7. An assembly as set forth in claim 1, wherein:
said locking head has an oblong configuration and is pivotably mounted upon said load-supporting surface of said load-supporting extension; and
said aperture of said load-supporting member has a correspondingly similar oblong configuration for receiving said locking head,
whereby when said locking head is disposed in a first pivotable position with respect to said aperture, said locking head can pass through said aperture, whereas when said locking head is pivoted 90° with respect to said first pivotable position, said upper and lower load-supporting members are locked together.

8. An assembly as set forth in claim 7, further comprising:
aperture means defined within said support surface of said load-supporting extension for providing access to said locking head so as to pivotably move said locking head between said first pivotable position and said position pivoted 90° with respect to said first pivotable position.

* * * * *